W. J. STEVENS.
Hose and Pipe Coupling.
No. 222,326. Patented Dec. 2, 1879.
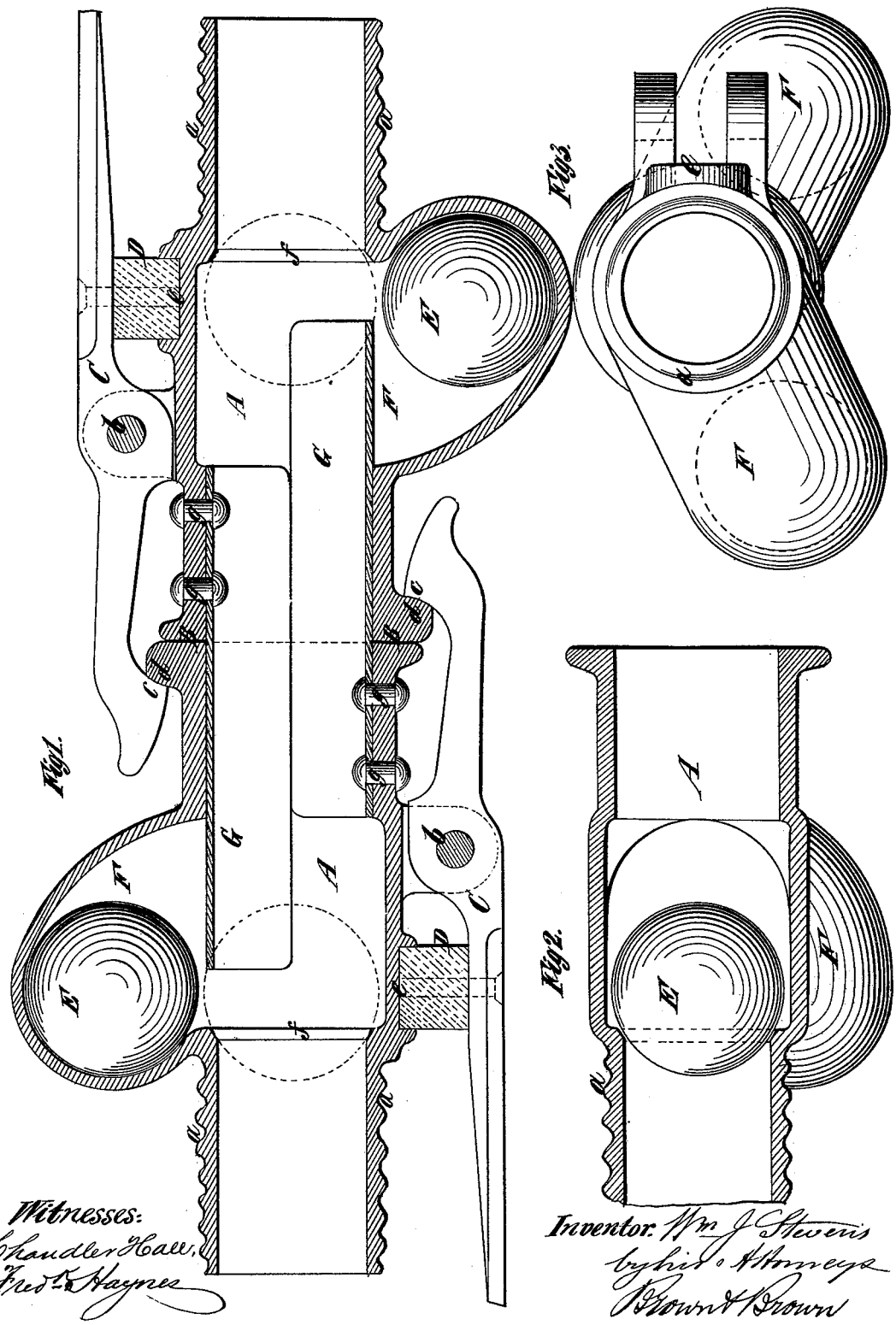

UNITED STATES PATENT OFFICE.

WILLIAM J. STEVENS, OF NEW YORK, N. Y.

IMPROVEMENT IN HOSE AND PIPE COUPLINGS.

Specification forming part of Letters Patent No. 222,326, dated December 2, 1879; application filed May 23, 1879.

*To all whom it may concern:*

Be it known that I, WILLIAM J. STEVENS, of the city of New York, in the county and State of New York, have invented certain new and useful Improvements in Couplings for Hose and Pipes, of which the following is a specification.

Although applicable to be employed with hose and pipes for any purpose, my coupling is especially intended for use in connection with the hose and pipes of vacuum-brakes for railway-trains. In couplings for such use it is very important that the valves with which the couplings are provided should close tightly when the two parts of which the coupling is composed are separated, as any leakage of air will render the action of the brake less effective, and possibly produce disastrous accidents.

My invention consists in a coupling the two parts of which correspond in shape, each being half male and half female, and are each provided with a cylindric socket, a partly-tubular extension adapted to enter the cylindric socket of the other part, a ball-valve, and a pocket or cavity for the reception of such valve when the latter is open. The said partly-tubular extensions preferably form stops for retaining the said valves in the said pockets or cavities when the parts are connected, for preventing the valves from escaping from the coupling when the parts are disconnected, and for preventing either of the said parts from being turned independently of the other part.

In the accompanying drawings, Figure 1 represents a horizontal section through a coupling embodying my improvements; Fig. 2, a vertical section through one of the parts or sections of said coupling, and Fig. 3 an end view thereof.

Similar letters of reference designate corresponding parts in all the figures.

A A designate the two parts or sections of which my coupling is composed, and which are provided upon their ends with corrugations *a*, in order to facilitate securing hose upon them.

The two parts A A correspond in shape each with the other, and are each half male and half female, so that either of said parts may be used with either of the parts of a corresponding coupling.

The ends of the two sections may be faced so as to form a butt-joint, as represented at B; or a rubber or other packing ring or gasket may be inserted between them, for the purpose of preventing leakage of air.

Each of said parts or sections is provided with a lever, C, pivoted at *b* to lugs projecting from the coupling, and provided upon its end with a hook, *c*, adapted to engage with a lip, *d*, upon the other of said parts or sections.

The hooks *c* and lips *d* are so shaped that upon pulling the two parts or sections A A in different directions they may be disengaged; but when not so pulled the said parts will be held in tight face-to-face contact.

For the purpose of holding the hooks *c* in engagement with the lips *d*, I employ springs D, here represented as of india-rubber, and as resting in recesses *e* upon the coupling.

Both of said parts or sections A A are also furnished with a valve, shown as consisting of a ball, E, of india-rubber or other material, and adapted, when the two parts of the coupling are separated, to close the pipe by resting in the valve-seat *f*, as represented in dotted outline in Fig. 1.

When the two parts of the coupling are connected the valves rest in pockets or cavities F, extending from the coupling, and thus afford an uninterrupted passage through the hose or pipes.

The parts A are each provided with a cylindric socket and a semi-tubular extension, G, adapted to fit within the cylindric socket of the other part. The said extensions G also form stops, adapted, when the parts of the coupling are connected, to partly or wholly close the said pockets or cavities for the purpose of retaining the valves therein.

The stops G are here represented as semi-tubular pieces of plate metal secured in the coupling by means of rivets *g*, and as they, together, form a cylindrical brace extending across the joint B, the leakage of air through the said joint is in a great measure prevented and the coupling strengthened. It is also obvious that each part of the coupling is adapted to be used in connection with a similar part of any other coupling, and hence the hose or pipe carried by one railway-car may be coupled with either end of a hose or pipe carried by an adjacent car.

When the stops G are formed of semi-tubular pieces of metal, with their adjacent sides impinging against each other, either part A is precluded from turning independently of the other part. The said stops serve not only to retain the valves in the pockets or cavities when the parts composing the coupling are connected, but they also serve to prevent the valves from escaping from the coupling when said parts are disconnected.

In order to facilitate the coupling of two pieces of hose or pipes, I preferably make the cavities F below the center of the coupling, as clearly represented in Fig. 3, so that the ball-valves will rest therein while the act of coupling is being performed.

In order to prevent any water from accumulating in the pockets or cavities F, and the consequent liability of freezing and bursting the coupling, the hose extending from the coupling may be secured so as to hold the coupling in the reverse position to that shown in Fig. 3, so that the pockets or cavities shall be above the center.

When it is desired to couple the two parts A A together each may be turned half round, so as to roll the ball-valves into the pockets or cavities, and upon being released the resilience of the hose will reverse the coupling and cause it to resume its normal position.

What I claim as my invention, and desire to secure by Letters Patent, is—

1. A coupling the two parts of which correspond in shape, each being half male and half female, and are each provided with a cylindrical socket, a partly-tubular extension, adapted to enter the cylindric socket of the other part, a ball-valve, and a pocket or cavity for the reception of such valve when the latter is open, substantially as specified.

2. The combination, with a coupling composed of the two parts A A, corresponding in shape with each other, each furnished with a ball-valve, E, and provided with a pocket or cavity, F, of a semi-tubular stop, G, made separate from and extending from each of said parts, and adapted to be inserted within the other of said parts, whereby the said valves are retained in said pockets or cavities, and the parts of the coupling are prevented from turning independently of each other, substantially as specified.

W. J. STEVENS.

Witnesses:
HENRY T. BROWN,
FREDK. HAYNES.